May 27, 1924.

A. JACQUELIN 1,495,850

DAMPING DEVICE WITH A BALANCED ACTION FOR OSCILLATING APPARATUS

Filed April 14, 1923

Inventor:
Armand Jacquelin
By Alf. S. Thun
Atty.

Patented May 27, 1924.

1,495,850

UNITED STATES PATENT OFFICE.

ARMAND JACQUELIN, OF PARIS, FRANCE.

DAMPING DEVICE WITH A BALANCED ACTION FOR OSCILLATING APPARATUS.

Application filed April 14, 1923. Serial No. 632,172.

*To all whom it may concern:*

Be it known that I, ARMAND JACQUELIN, citizen of the Republic of France, residing at 11 Avenue Pasteur, Paris, France, have invented certain new and useful Improvements in Damping Devices with a Balanced Action for Oscillating Apparatus, of which the following is a specification.

Damping devices for oscillating apparatus, interposed between such apparatus and their fixed frame and characterized by two series of adjustable springs acting in opposite directions to each other are old. The object of such devices is to eliminate the strains which fatigue the parts which produce the oscillating movement by transferring them elastically to the fixed frame. The motive force is in this way almost annulled, and thus also the shocks on the frame. Even with such devices however the frame is still subjected to alternate forces which may bring about in certain cases horizontal vibrations which may be troublesome and even become dangerous.

My invention has for its object to obviate this disadvantage.

The new device comprises substantially a counterweight of any nature and of a suitably chosen mass, so connected to the oscillating apparatus as to oscillate about the same axes as this apparatus but in opposite direction thereto. This counterweight is itself provided with its own damping system which develops on the frame reactions which combine with the reactions of the damping apparatus of the oscillating apparatus in such a way that the resulting force has no horizontal component.

Various embodiments of my invention are shown by way of example in the accompanying drawing in which—

Figure 1:
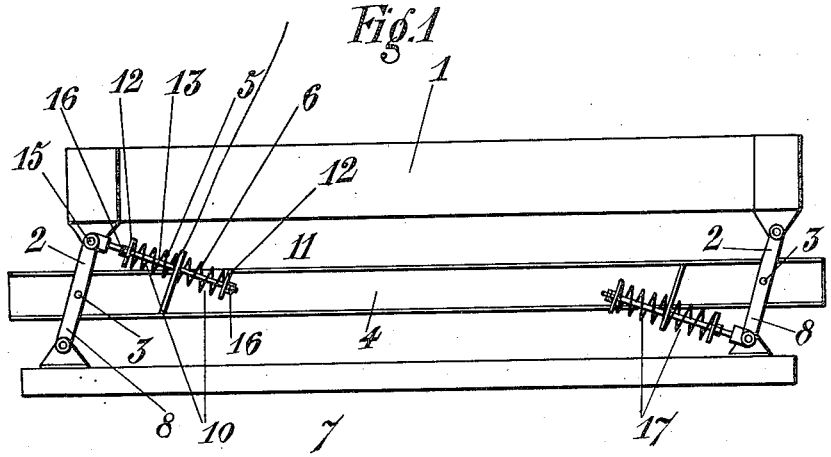
Figure 1 is an elevation of a jig transporter equipped with a damping device according to my invention.

The jig transporter 1, oscillating on the ends of equal and parallel links 2 (see Figure 1) is thereby pivoted at 3 to shafts carried by the fixed frame 4.

The damping system 10 of the jig transporter is constituted by two series of springs 5 and 6 bearing against either side of a support 11 integral with the fixed frame 4. These two series of springs are supported at their outer ends by two plates 12 fixed to a connecting rod 13 pivoted at 15 on the oscillating apparatus 1. Regulating screws 16 are screwed on the ends of rod 13 for controlling the tension of springs 5 and 6.

This damping system thus comprises two series of adjustable springs acting in opposite directions to each other on the oscillating apparatus 1.

My device according to the invention is constructed with the counterweight 7 mounted on the ends of two equal and parallel links 8 of the same length as the links 2, to which they are rigidly connected, the pivotal axes 3 being the same.

The counterweight 7 thus has the same amount of oscillation as the apparatus 1 itself, but in the opposite direction. It has a damping system 17, of its own of the same kind as the system 10 of the apparatus 1, and acting in the same direction, so that at each movement the reactions exerted on the frame 4 by the two damping devices 10 and 17 are equal and parallel but opposite in direction. These reactions thus constitute a couple the sole effect of which is to produce torsional stresses in the frame.

Figure 2:
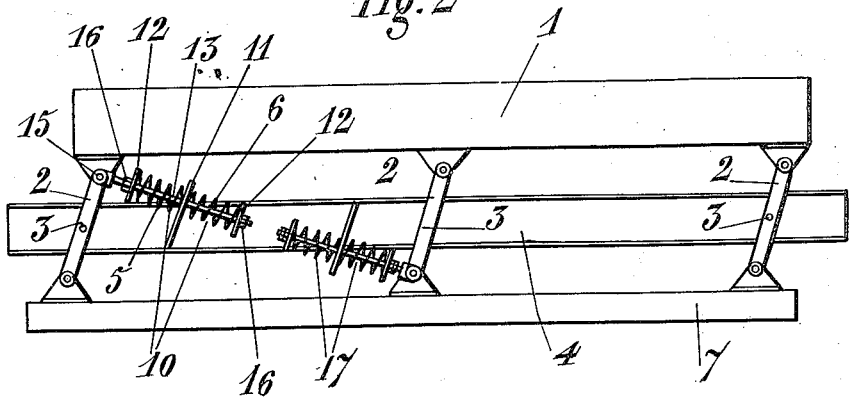
Figure 2 is an elevation of a particular embodiment of the device shown in Figure 1.

Figure 2 represents a particular application of the preceding device in which the two damping systems are arranged directly opposite to each other. In this case the reactions of these two systems balance themselves completely on the frame.

Figure 3:
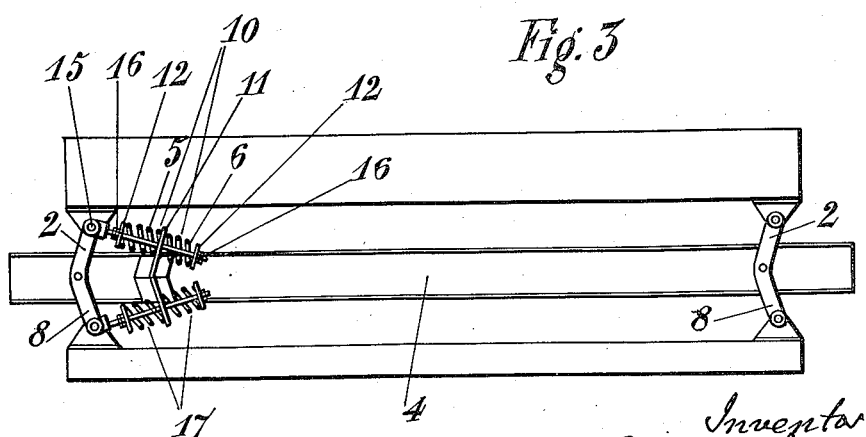
Figure 3 is an elevation of a modification of said device.

Figure 3 represents another device according to my invention. The links 8 integral with the links 2, instead of being extensions of these links 2, are symmetrical thereto with relation to the horizontal plane. The same thing is the case therefore with the two damping systems 10 and 17 the reactions of which are at each movement equal and symmetrical with respect to a vertical axis. The resultant of these reactions is therefore constantly vertical.

The invention embraces also the particular case in which the counterweight is constructed with a second transporting apparatus or sieve capable of being utilized in parallel or in series with the first one.

I claim as my invention:

1. In an oscillating system, the combination with a fixed frame, of an apparatus adapted to oscillate about pivotal axes, a balancing counterweight adapted to oscillate about the same axes, means connecting the said apparatus and counterweight, a damping system comprising two series of springs, each series abutting with one end against a fixed portion of the said frame and with the other end against a part connected with the said oscillating apparatus, the said two series of springs acting in opposite direction on the said oscillating apparatus, a second damping system comprising two series of springs, each series abutting with one end against a fixed part of the said frame and with the other end against a part connected to said counterweight, the said two series of springs acting in opposite direction on the said counterweight, the said two damping systems developing on the said frame reactions with mutually neutralizing horizontal components.

2. The combination as specified in claim 1, in which the said two damping systems are arranged directly opposite each other, the reactions of the said two systems on the said frame completely balancing each other.

3. The combination as specified in claim 1, in which the balancing counterweight consists in an apparatus of the same kind as the said oscillating apparatus.

In testimony whereof I have affixed my signature.

ARMAND JACQUELIN.